United States Patent
Chalmers

(10) Patent No.: US 10,571,615 B2
(45) Date of Patent: Feb. 25, 2020

(54) HIGH-LIFETIME BROADBAND LIGHT SOURCE FOR LOW-POWER APPLICATIONS

(71) Applicant: FILMETRICS, INC., San Diego, CA (US)

(72) Inventor: Scott A. Chalmers, San Diego, CA (US)

(73) Assignee: FILMETRICS, INC., San Diego, CA (US)

( * ) Notice: Subject to any disclaimer, the term of this patent is extended or adjusted under 35 U.S.C. 154(b) by 0 days.

(21) Appl. No.: 15/178,030

(22) Filed: Jun. 9, 2016

(65) Prior Publication Data

US 2016/0356938 A1 Dec. 8, 2016

Related U.S. Application Data

(63) Continuation of application No. 13/742,782, filed on Jan. 16, 2013, now abandoned.

(51) Int. Cl.

| | |
|---|---|
| *F21K 9/61* | (2016.01) |
| *F21V 8/00* | (2006.01) |
| *G01J 3/10* | (2006.01) |
| *G02B 6/42* | (2006.01) |
| *F21V 5/04* | (2006.01) |
| *F21L 2/00* | (2006.01) |
| *G02B 27/10* | (2006.01) |
| *G02B 27/30* | (2006.01) |

(Continued)

(52) U.S. Cl.
CPC .............. *G02B 6/0006* (2013.01); *F21K 9/61* (2016.08); *F21L 2/00* (2013.01); *F21V 5/04* (2013.01); *G01J 3/10* (2013.01); *G02B 6/0008* (2013.01); *G02B 6/4298* (2013.01); *G02B 27/1006* (2013.01); *G02B 27/30* (2013.01); *F21L 2001/00* (2013.01); *F21Y 2111/00* (2013.01); *F21Y 2115/10* (2016.08); *G01J 3/0218* (2013.01); *G01J 3/0251* (2013.01); *G01J 2003/102* (2013.01)

(58) Field of Classification Search
CPC ............... G02B 6/0096; G02B 6/0006; G02B 27/1006; G02B 6/0008
See application file for complete search history.

(56) References Cited

U.S. PATENT DOCUMENTS

| | | | | |
|---|---|---|---|---|
| 4,932,747 A | * | 6/1990 | Russell | ................... G02B 6/04 219/121.6 |
| 5,301,090 A | * | 4/1994 | Hed | .......................... F21V 9/10 362/101 |

(Continued)

OTHER PUBLICATIONS

WIPO, ISR for PCT/US2013/021716, Jun. 5, 2013.
EUIPO, EPSR for EP13738421, Jun. 12, 2015.

*Primary Examiner* — Evan P Dzierzynski
(74) *Attorney, Agent, or Firm* — Hodgson Russ LLP

(57) ABSTRACT

Embodiments described herein include broadband light source system comprising an optic coupler including a plurality of input branches coupled to an output. The system includes a plurality of light sources coupled to the plurality of input branches. Each light source outputs light having a different wavelength distribution than any other light source of the plurality of light sources. The output emits a broadband light source comprising a combined spectral output of the plurality of light sources.

62 Claims, 4 Drawing Sheets

(51) Int. Cl.
*G01J 3/02* (2006.01)
*F21Y 115/10* (2016.01)
*F21V 1/00* (2006.01)
*F21Y 111/00* (2016.01)

(56) References Cited

U.S. PATENT DOCUMENTS

| | | |
|---|---|---|
| 5,475,221 A | 12/1995 | Wang |
| 6,055,099 A | 4/2000 | Webb |
| 6,206,532 B1* | 3/2001 | Hawes ................. G02B 27/283 |
| | | 348/E5.141 |
| 7,055,986 B2* | 6/2006 | Littleton ................... G01J 1/08 |
| | | 362/231 |
| 2003/0123261 A1 | 7/2003 | Muthu et al. |
| 2003/0191379 A1 | 10/2003 | Benaron et al. |
| 2003/0234751 A1 | 12/2003 | Hwang |
| 2004/0109329 A1* | 6/2004 | Kato ...................... H04N 9/315 |
| | | 362/555 |
| 2005/0207160 A1* | 9/2005 | Babayoff ........... G02B 21/0032 |
| | | 362/259 |
| 2006/0210726 A1 | 9/2006 | Jones et al. |
| 2007/0060984 A1 | 3/2007 | Webb |
| 2007/0159818 A1 | 7/2007 | Rueggeberg |
| 2008/0304712 A1 | 12/2008 | Rowe et al. |
| 2009/0284965 A1* | 11/2009 | Zheng ................ G02B 27/1006 |
| | | 362/231 |
| 2009/0322236 A1* | 12/2009 | Chang ................ H05B 33/0803 |
| | | 315/185 S |
| 2010/0020565 A1* | 1/2010 | Seward ................ G02B 6/0006 |
| | | 362/555 |
| 2010/0216143 A1 | 8/2010 | King et al. |
| 2010/0283381 A1* | 11/2010 | Takahashi ............. C04B 35/597 |
| | | 313/503 |
| 2010/0328935 A1* | 12/2010 | Pance ................... F21S 10/005 |
| | | 362/231 |
| 2011/0170097 A1* | 7/2011 | Chalmers ........... G01B 11/0625 |
| | | 356/326 |
| 2011/0286665 A1* | 11/2011 | Umeda ................ H04N 1/6086 |
| | | 382/167 |

* cited by examiner

From http://www.prizmatix.com/docs/UHP-Mic-LED-White.cfm

HIGH-LIFETIME BROADBAND LIGHT SOURCE FOR LOW-POWER APPLICATIONS

RELATED APPLICATION

This application is a continuation of U.S. patent application Ser. No. 13/742,782, filed Jan. 16, 2013, which claims the benefit of U.S. Patent Application No. 61/586,934, filed Jan. 16, 2012.

TECHNICAL FIELD

This invention relates generally to the field of light sources used with portable equipment, particularly with miniature spectrometers.

BACKGROUND

Compact fiber-optic detector-array-based spectrometers ("miniature spectrometers") pioneered by H.-E. Korth of IBM Germany and popularized most notably by Ocean Optics, Inc. have found widespread use in a multitude of applications due to their low cost, small size, and low power consumption compared to conventional spectrometers. The purpose of these spectrometers is to measure the intensity of light as a function of wavelength. For example, see "A Computer Integrated Spectrophotometer for Film Thickness Monitoring," H.-E. Korth, IBM Germany, JOURNAL DE PHYSIQUE, Colloque CIO, Supplement Number 12, Tome M, December 1983, pg. C10-101.

Oftentimes such a spectrometer is used in a system that characterizes a material by analyzing how the material interacts with light over a range of wavelengths. Common examples are reflectance and transmittance measurement systems. Such systems require a light source to generate the light that is eventually analyzed by the spectrometer.

The type of light source that is used with a miniature spectrometer depends primarily on the wavelength range of the spectrometer. For ultraviolet wavelengths (below ~380 nm) a deuterium light source (e.g., Hamamatsu L10290) is generally used. In some limited cases (e.g., color measurements) when only visible wavelengths (450-700 nm) are of interest a white-light LED can be used. However, the majority of miniature spectrometer applications fall within the 380-2200 nm wavelength range, where an incandescent source is nearly always used. By far the most common incandescent source used with miniature spectrometers is a tungsten-halogen lamp, e.g., the LS-1 from Ocean Optics, Inc.

Incandescent light sources are widely used for broadband applications because they are relatively stable, bright, and inexpensive. However, they do require a considerable amount of power to operate; the lamp in the aforementioned Ocean Optics LS-1 uses 6.5 W, for example. This is on the order of fifty times more power than is required to operate a typical miniature spectrometer. This not only greatly restricts the length of time that battery-powered incandescent-based miniature spectrometer systems can operate on a single charge, but it also prevents such systems from being powered through a Universal Serial Bus (USB) cable (which is limited to 2.25 W power draw).

INCORPORATION BY REFERENCE

Each publication, patent, and/or patent application mentioned in this specification is herein incorporated by reference in its entirety to the same extent as if each individual publication, patent and/or patent application was specifically and individually indicated to be incorporated by reference.

BRIEF DESCRIPTION OF THE DRAWINGS

The components in the figures are not necessarily to scale, emphasis instead being placed upon illustrating the principles of the embodiments. In the figures, like reference numerals designate corresponding parts throughout the different views.

DETAILED DESCRIPTION

Embodiments are described herein that provide a low-cost high-lifetime broadband light source for low-power applications, particularly those that use miniature spectrometers.

Figure 1:
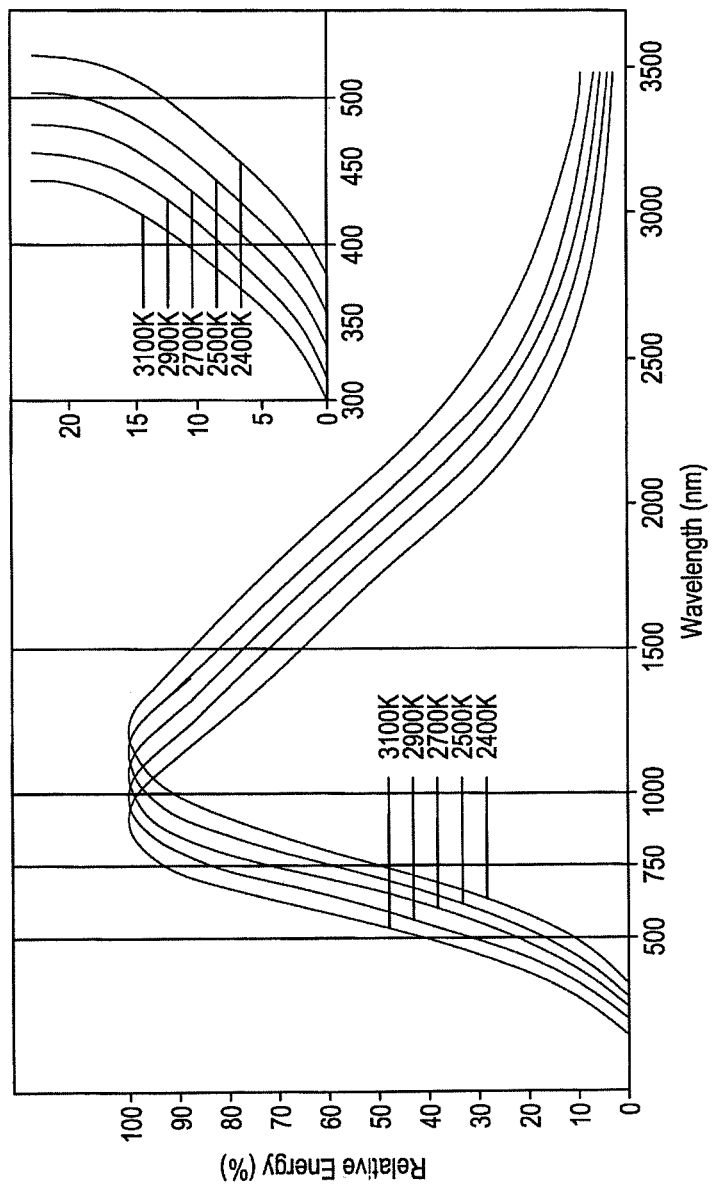
FIG. 1 shows light output from incandescent lamps of different color temperature.

Incandescent lamps emit light by heating a filament by passing an electric current through the filament. The heated filament emits light as a function of wavelength as described by the well-known blackbody radiation equation. The hotter a filament is the higher will be its equivalent blackbody temperature and the more its light output will be shifted to shorter wavelengths. For example, FIG. 1 shows a plot of light output from incandescent lamps of different color temperature versus relative energy (percent). Also, the hotter the filament the faster that it evaporates or sublimes and thus the shorter the lamp lifetime (approximately 250 hours for 3100K and 40,000 hours for 2200K are typical for tungsten-halogen lamps). In addition, a hotter filament uses considerably more power than a cooler filament.

Incandescent lamps used in miniature spectrometer applications generally have a color temperature of at least 2900K, primarily for sufficient output at wavelengths near 400 nm and below. Lifetimes of around 1000 hours and power consumption of more than 5 W are typical (e.g., Welch-Allyn part number 01175-U). A lamp with comparable output at longer wavelengths (e.g., International Light Technologies part number 4115-12A) running at 2200K has a lifetime of 40,000 hours and only uses 0.58 W, but its output below 500 nm is too low to be useful for most spectrometer applications.

Figure 2:
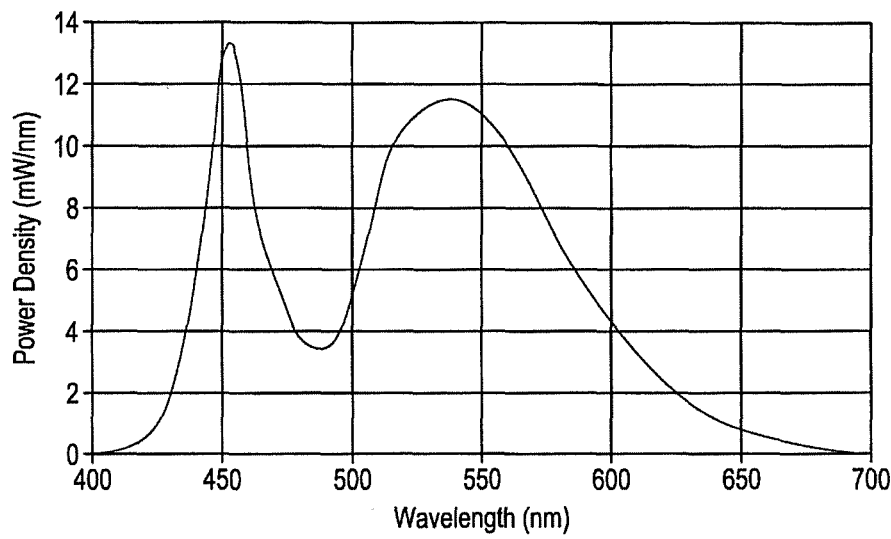
FIG. 2 shows the light output from a typical white-light LED.

Light-emitting diodes (LEDs) are replacing incandescent lamps in many applications due to their greater efficiency and 50,000-hour (typical) lifetime. LEDs are now available throughout the 240-1000 nm wavelength range with power requirement in the 20 mW range (for output levels suitable for miniature spectrometer applications). For low-power applications a consideration when using LEDs is the narrow wavelength range of their output. Most LEDs in the UV and visible wavelength ranges have an output that is only 20-30 nm wide. White-light LEDs use a phosphor that emits approximately 460-650 nm, which augments the output of the blue LED that drives the phosphor to produce a total output of approximately 430-650 nm. For example, FIG. 2 shows the light output from a typical white-light LED.

Figure 3:
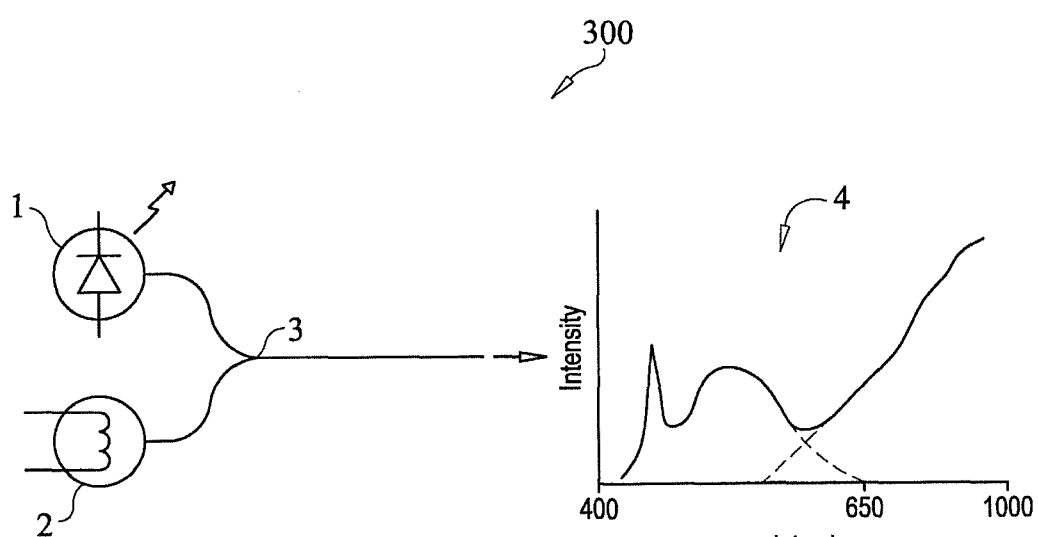
FIG. 3 shows an apparatus for combining light from a white-light LED and a low-color-temperature incandescent lamp using a fiber-optic coupler, under an embodiment.

Embodiments described herein include an apparatus that efficiently combines the light from one or more LEDs with a low-color-temperature incandescent lamp, thereby realizing a high-lifetime broadband light source suitable for low-power applications. As an example, FIG. 3 shows a light-combining apparatus 300 that combines light from a white-light LED with light from a low-color-temperature incandescent lamp using a fiber-optic coupler, under an embodiment. The apparatus 300 includes a two-input fiber optic coupler 3 coupled to a white-light LED 1 and a low-color-temperature incandescent lamp 2. The fiber-optic coupler 3 of an embodiment is a dual-branch fiber-optic light guide available from Edmund Optics (part number NT54-199), or a fused coupler such as those available from OZ Optics (www.ozoptics.com), for example, but is not so limited. White-light LED 1 and the low-color-temperature incandescent lamp 2 can be of the types described herein, but are not so limited.

In this embodiment, the output of white-light LED 1 and the output of low-color-temperature incandescent lamp 2 are directed into the two input legs of the two-input fiber optic coupler 3. The resultant spectrum 4 emitting from the fiber-optic coupler 3 is the combined spectral output of the white-light LED 1 source and the low-color-temperature incandescent lamp 2 source.

Fiber-optic couplers generally have light-throughput efficiency as high as approximately 70%. The numerical aperture (NA) and diameter of the ends of the fiber-optic coupler 3 of an embodiment provide from the light-combining apparatus 300 most of the light available from white-light LED 1 and low-color-temperature incandescent lamp 2 for a specific miniature spectrometer application.

Figure 4:
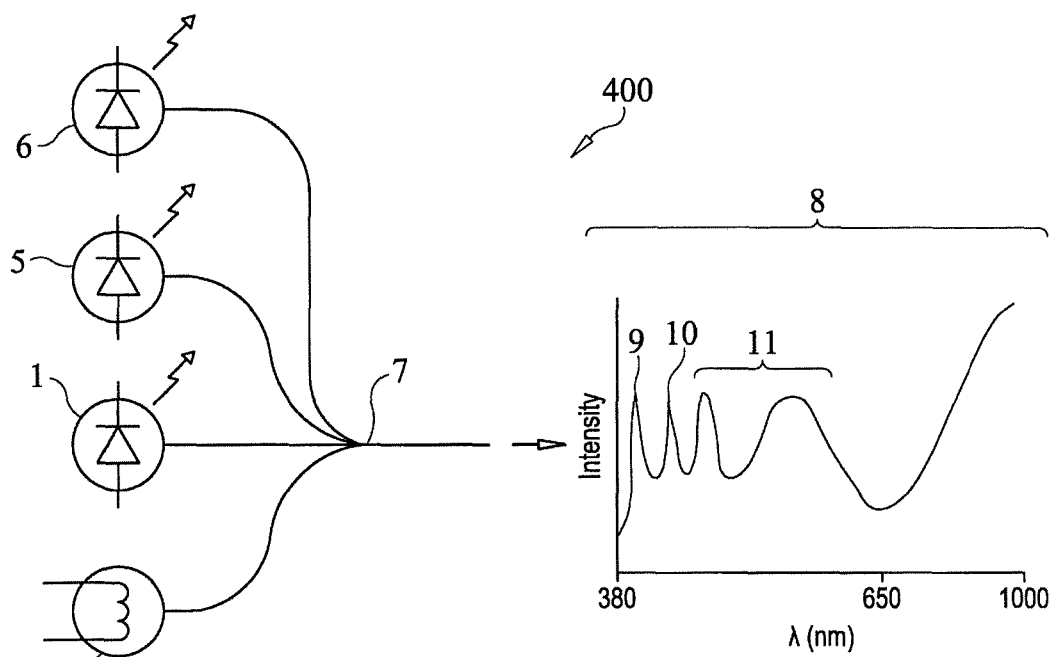
FIG. 4 shows a light-combining apparatus that combines light from a white-light LED, a low-color-temperature incandescent lamp, and two shorter-wavelength LEDs using a fiber-optic coupler, under an alternative embodiment.

FIG. 4 shows a light-combining apparatus 400 that combines light from a white-light LED, a low-color-temperature incandescent lamp, and two shorter-wavelength LEDs using a fiber-optic coupler, under an alternative embodiment. The apparatus 400 includes a four-input fiber optic coupler 7 coupled to a white-light LED 1, a low-color-temperature incandescent lamp 2, and two LEDs 5 and 6. The four-input fiber optic coupler 7 operates under the same principles as the two-input fiber optic coupler 3. The white-light LED 1 and the low-color-temperature incandescent lamp 2 can be of the types described herein, but are not so limited.

In this embodiment, the output of white-light LED 1 and the output of low-color-temperature incandescent lamp 2 are directed into two input legs of a four-input fiber optic coupler 7. Further, at least two additional LEDs 5 and 6 are directed into the two remaining input legs of the four-input fiber optic coupler 7. The two additional LEDs 5 and 6 of an embodiment fill in the short wavelength end of the resultant spectrum 8, but are not so limited. The resultant spectrum 8 emitting from fiber-optic coupler 7 is the combined spectral output of the white-light LED 1 source, the low-color-temperature incandescent lamp 2 source, and the two additional LED sources 5 and 6. The light contributions from LED 5 and LED 6 can be seen as additional peaks 9 and 10 in the resultant spectrum 8.

Figure 5:
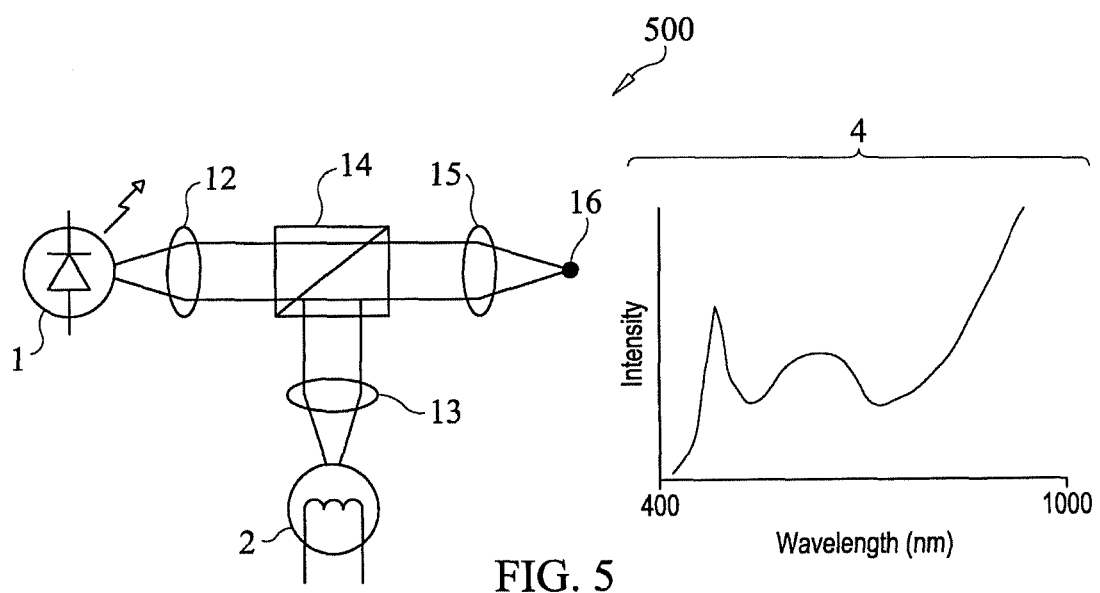
FIG. 5 shows a light-combining apparatus that combines light from a white-light LED and a low-color-temperature incandescent lamp using a beamsplitter, under another alternative embodiment.

FIG. 5 shows a light-combining apparatus 500 that combines light from a white-light LED and a low-color-temperature incandescent lamp using a beamsplitter, under another alternative embodiment. The apparatus 500 includes two collimating lenses 12 and 13, and a focusing lens 15. The apparatus 500 also includes a beamsplitter. The beamsplitter 14 of an embodiment comprises a broadband beamsplitter or a "hot mirror" or "cold mirror" beamsplitter that reflects and transmits the higher and lower wavelengths selectively for a more efficient combining process, but is not so limited. In this embodiment the collimating lenses 12 and 13 collimate light from the white-light LED 1 and the low-color-temperature incandescent lamp 2, respectively. The beamsplitter 14 combines the resulting collimated beams into a single collimated beam, and the focusing lens 15 focuses the combined collimated beam to a point 16.

Figure 6:
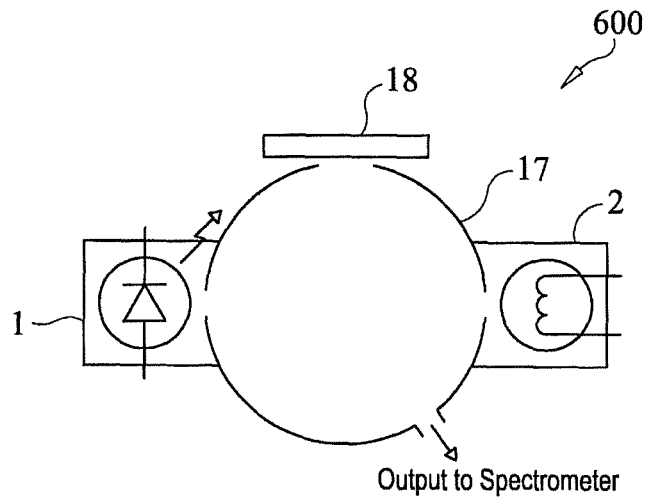
FIG. 6 shows a light-combining apparatus that combines light from a white-light LED and a low-color-temperature incandescent lamp using an integrating sphere, under yet another alternative embodiment.

FIG. 6 shows a light-combining apparatus 600 that combines light from a white-light LED and a low-color-temperature incandescent lamp using an integrating sphere, under yet another alternative embodiment. The apparatus 600 includes an integrating sphere 17 coupled to a white-light LED 1 and a low-color-temperature incandescent lamp 2. In this embodiment, light from the white-light LED 1 and the low-color-temperature incandescent lamp 2 are combined inside of the integrating sphere 17. The integrating sphere 17 is used to measure the reflectance of a sample 18, but is not so limited.

Figure 7:
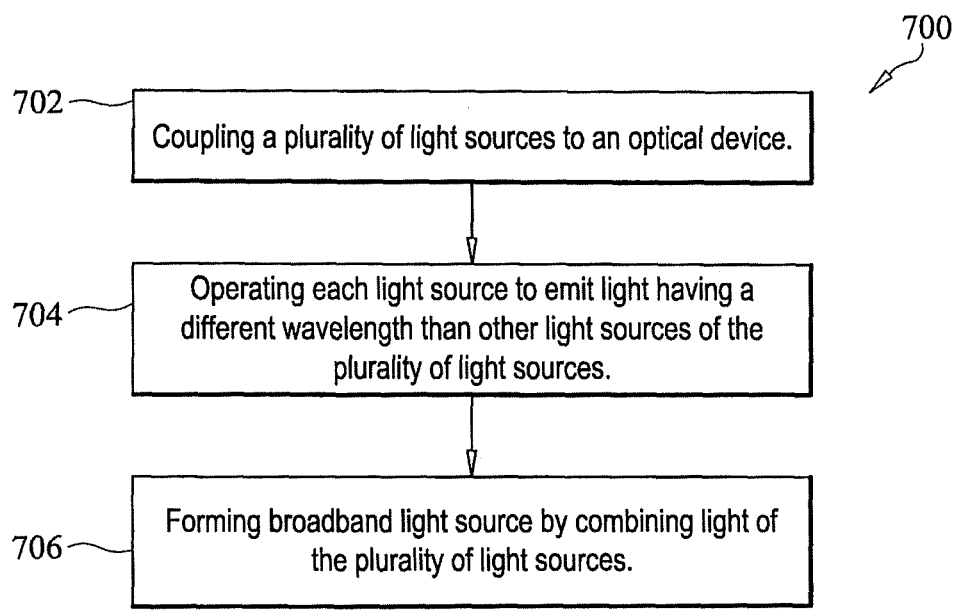
FIG. 7 is a flow diagram for generating a broadband light source, under an embodiment.

FIG. 7 is a flow diagram for generating a broadband light source 700, under an embodiment. Generally, the generating of a broadband light source of an embodiment comprises coupling 702 a plurality of light sources to an optical device. The generating comprises operating 704 each light source of the plurality of light sources to emit light having a different wavelength than other light sources of the plurality of light sources. The generating comprises forming 706 a broadband light source by combining at the optical device light of the plurality of light sources.

Embodiments described herein include a system comprising an optic coupler including a plurality of input branches coupled to an output. The system includes a plurality of light sources coupled to the plurality of input branches. A first light source of the plurality of light sources outputs light has a different wavelength distribution than at least one other light source of the plurality of light sources. The first light source comprises an incandescent light. The output emits a broadband light source comprising a combined spectral output of the plurality of light sources.

Embodiments described herein include a system comprising: an optic coupler including a plurality of input branches coupled to an output; a plurality of light sources coupled to the plurality of input branches, wherein a first light source of the plurality of light sources outputs light having a different wavelength distribution than at least one other light source of the plurality of light sources, wherein the first light source comprises an incandescent light; wherein the output emits a broadband light source comprising a combined spectral output of the plurality of light sources.

The optic coupler of an embodiment comprises a fused coupler.

The optic coupler of an embodiment comprises a fiber optic coupler.

The optic coupler of an embodiment comprises a dual-branch fiber optic light guide.

The incandescent light of an embodiment is coupled to a first input branch of the fiber optic coupler.

The incandescent light of an embodiment comprises a low-color-temperature incandescent light.

The plurality of light sources of an embodiment includes a light emitting diode (LED).

The LED of an embodiment is coupled to a second input branch of the fiber optic coupler.

The LED of an embodiment comprises a white-light LED.

The optic coupler of an embodiment comprises a quad-branch fiber optic light guide.

The incandescent light of an embodiment is coupled to a first input branch of the fiber optic coupler.

The incandescent light of an embodiment comprises a low-color-temperature incandescent light.

The plurality of light sources of an embodiment includes a first LED.

The first LED of an embodiment is coupled to a second input branch of the fiber optic coupler.

The first LED of an embodiment comprises a white-light LED.

The plurality of light sources of an embodiment includes a second LED.

The second LED of an embodiment is coupled to a third input branch of the fiber optic coupler.

The second LED of an embodiment comprises a short-wavelength LED.

The plurality of light sources of an embodiment include a third LED.

The third LED of an embodiment is coupled to a fourth input branch of the fiber optic coupler.

The third LED of an embodiment comprises a short-wavelength LED.

The optic coupler of an embodiment comprises a beam splitter.

The plurality of input branches of an embodiment includes a first face of the beam splitter and a second face of the beam splitter.

The beam splitter of an embodiment is positioned to receive at the first face first illumination from the first light source, wherein the beam splitter directs the first illumination from the first face to the output.

The beam splitter of an embodiment is positioned to receive at the second face second illumination from a second light source, wherein the beam splitter directs the second illumination from the second face to the output.

The system of an embodiment comprises a first lens positioned between the first light source and the first face of the beam splitter, wherein the first lens is a collimating lens.

The system of an embodiment comprises a second lens positioned between the second light source and the second face of the beam splitter, wherein the second lens is a collimating lens.

The output of an embodiment comprises a third face of the beam splitter.

The system of an embodiment comprises a third lens positioned adjacent to the third face of the beam splitter, wherein the third lens is a focusing lens.

The incandescent light of an embodiment comprises a low-color-temperature incandescent light.

The second light source of an embodiment includes a light emitting diode (LED).

The LED of an embodiment comprises a white-light LED.

The beam splitter of an embodiment comprises a broadband beam splitter.

The beam splitter of an embodiment comprises a hot mirror beam splitter.

The beam splitter of an embodiment comprises a cold mirror beam splitter.

The optic coupler of an embodiment comprises an integrating sphere.

The plurality of input branches of an embodiment comprises a plurality of ports.

The output of an embodiment comprises an output port.

The incandescent light of an embodiment is coupled to a first port of the integrating sphere.

The incandescent light of an embodiment comprises a low-color-temperature incandescent light.

The plurality of light sources of an embodiment includes a light emitting diode (LED).

The LED of an embodiment is coupled to a second port of the integrating sphere.

The LED of an embodiment comprises a white-light LED.

The plurality of light sources of an embodiment includes a second LED.

The second LED of an embodiment is coupled to a third port of the integrating sphere.

The second LED of an embodiment comprises a short-wavelength LED.

The plurality of light sources of an embodiment include a third LED.

The third LED of an embodiment is coupled to a fourth port of the integrating sphere.

The third LED of an embodiment comprises a short-wavelength LED.

Embodiments described herein include a system comprising an optic coupler including a plurality of inputs and an output. The system includes a first light source coupled to a first input of the plurality of inputs. The first light source comprises an incandescent light. The system includes a second light source coupled to a second input of the plurality of inputs. The second light source outputs light having a different wavelength distribution than at least the first light source of the plurality of light sources. The output emits a broadband light source comprising a combined spectral output of the first light source and the second light source.

Embodiments described herein include a system comprising: an optic coupler including a plurality of inputs and an output; a first light source coupled to a first input of the plurality of inputs, wherein the first light source comprises an incandescent light; and a second light source coupled to a second input of the plurality of inputs, wherein the second light source outputs light having a different wavelength distribution than at least the first light source of the plurality of light sources; wherein the output emits a broadband light source comprising a combined spectral output of the first light source and the second light source.

The optic coupler of an embodiment comprises a fiber optic light guide including a plurality of input branches.

The plurality of inputs of an embodiment includes the plurality of input branches.

The optic coupler of an embodiment comprises a beam splitter.

The plurality of inputs of an embodiment includes a plurality of faces of the beam splitter.

The optic coupler of an embodiment comprises an integrating sphere.

The plurality of inputs of an embodiment comprises a plurality of ports of the integrating sphere.

Embodiments described herein include a system comprising an optic coupler including a plurality of inputs and an output. The system includes a first light source coupled to a first input of the plurality of inputs. The first light source comprises an incandescent light. The system includes a second light source coupled to a second input of the plurality of inputs. The second light source outputs light having a different wavelength distribution than at least the first light source. The system includes a third light source coupled to a third input of the plurality of inputs. The third light source outputs light having a different wavelength than at least the first light source and the second light source. The system includes a fourth light source coupled to a fourth input of the plurality of inputs. The fourth light source outputs light having a different wavelength than at least the first light source and the second light source. The output emits a broadband light source comprising a combined spectral output of the first light source, the second light source, the third light source, and the fourth light source.

Embodiments described herein include a system comprising: an optic coupler including a plurality of inputs and an output; a first light source coupled to a first input of the plurality of inputs, wherein the first light source comprises an incandescent light; a second light source coupled to a second input of the plurality of inputs, wherein the second light source outputs light having a different wavelength distribution than at least the first light source; a third light source coupled to a third input of the plurality of inputs, wherein the third light source outputs light having a different wavelength than at least the first light source and the second light source; a fourth light source coupled to a fourth input of the plurality of inputs, wherein the fourth light source outputs light having a different wavelength than at least the first light source and the second light source; wherein the output emits a broadband light source comprising a combined spectral output of the first light source, the second light source, the third light source, and the fourth light source.

The optic coupler of an embodiment comprises a fiber optic light guide including a plurality of input branches.

The plurality of inputs of an embodiment includes the plurality of input branches.

The optic coupler of an embodiment comprises at least one beam splitter.

The plurality of inputs of an embodiment includes a plurality of faces of the at least one beam splitter.

The optic coupler of an embodiment comprises an integrating sphere.

The plurality of inputs of an embodiment comprises a plurality of ports of the integrating sphere.

Embodiments described herein include a system comprising a plurality of light sources. A first light source of the plurality of light sources comprises an incandescent light. A second light source of the plurality of light sources outputs light has a different wavelength distribution than the first light source. The system includes a plurality of lenses. Each lens of the plurality of lenses is optically coupled to each light source of the plurality of light sources. The system includes an optical device optically coupled to the plurality of lenses. The optical device combines light received from the plurality of lenses. An output from the optical device comprises broadband light having a combined spectral output of the plurality of light sources.

Embodiments described herein include a system comprising: a plurality of light sources, wherein a first light source of the plurality of light sources comprises an incandescent light, wherein a second light source of the plurality of light sources outputs light having a different wavelength distribution than the first light source; a plurality of lenses, wherein each lens of the plurality of lenses is optically coupled to each light source of the plurality of light sources; and an optical device optically coupled to the plurality of lenses, wherein the optical device combines light received from the plurality of lenses, wherein an output from the optical device comprises broadband light having a combined spectral output of the plurality of light sources.

Embodiments described herein include a system comprising a plurality of light sources. A first light source of the plurality of light sources comprises an incandescent light. A second light source of the plurality of light sources outputs light has a different wavelength distribution than the first light source. The system includes an optical integrating sphere comprising a plurality of input ports and an output port. The plurality of light sources is optically coupled to the plurality of input ports. The optical integrating sphere combines light of the plurality of light sources. The output port outputs broadband light comprising a combined spectral output of the plurality of light sources.

Embodiments described herein include a system comprising: a plurality of light sources, wherein a first light source of the plurality of light sources comprises an incandescent light, wherein a second light source of the plurality of light sources outputs light having a different wavelength distribution than the first light source; and an optical integrating sphere comprising a plurality of input ports and an output port, wherein the plurality of light sources are optically coupled to the plurality of input ports, wherein the optical integrating sphere combines light of the plurality of light sources, wherein the output port outputs broadband light comprising a combined spectral output of the plurality of light sources.

Embodiments described herein include a method comprising coupling a plurality of light sources to an optical device. The method includes operating a first light source of the plurality of light sources to emit incandescent light. The method includes operating a second light source of the plurality of light sources to emit light having a different wavelength distribution than the at least the first light source. The method includes forming a broadband light source by combining at the optical device light of the plurality of light sources.

Embodiments described herein include a method comprising: coupling a plurality of light sources to an optical device; operating a first light source of the plurality of light sources to emit incandescent light; operating a second light source of the plurality of light sources to emit light having a different wavelength distribution than the at least the first light source; and forming a broadband light source by combining at the optical device light of the plurality of light sources.

Coupling the plurality of light sources to an optical device of an embodiment comprises coupling each light source to each input branch of a plurality of input branches of a fiber optic light guide.

Coupling the plurality of light sources to an optical device of an embodiment comprises coupling each light source to each face of at least one beam splitter.

The beam splitter of an embodiment comprises a broadband beam splitter.

The beam splitter of an embodiment comprises a hot mirror beam splitter.

The beam splitter of an embodiment comprises a cold mirror beam splitter.

Coupling the plurality of light sources to an optical device of an embodiment comprises coupling each light source to each input port of a plurality of input ports of an integrating sphere.

The incandescent light of an embodiment comprises a low-color-temperature incandescent light.

The second light source of an embodiment includes a light emitting diode (LED).

The LED of an embodiment comprises a white-light LED.

The plurality of light sources of an embodiment includes a second LED.

The second LED of an embodiment comprises a short-wavelength LED.

The plurality of light sources of an embodiment include a third LED.

The third LED of an embodiment comprises a short-wavelength LED.

Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above description of embodiments of the light source systems and methods is not intended to be exhaustive or to limit the systems and methods described to the precise form disclosed. While specific embodiments of, and examples for, the light source systems and methods are described herein for illustrative purposes, various equivalent modifications are possible within the scope of other light source systems and methods, as those skilled in the relevant art will recognize. The teachings of the light source systems and methods provided herein can be applied to other processing and measurement systems and methods, not only for the systems and methods described above.

The elements and acts of the various embodiments described above can be combined to provide further embodiments. These and other changes can be made to the light source systems and methods in light of the above detailed description.

In general, in the following claims, the terms used should not be construed to limit the light source systems and methods to the specific embodiments disclosed in the specification and the claims, but should be construed to include all systems and methods that operate under the claims. Accordingly, the light source systems and methods are not limited by the disclosure, but instead the scope of the light source systems and methods is to be determined entirely by the claims.

While certain aspects of the light source systems and methods are presented below in certain claim forms, the inventors contemplate the various aspects of the light source systems and methods in any number of claim forms. Accordingly, the inventors reserve the right to add additional claims after filing the application to pursue such additional claim forms for other aspects of the light source systems and methods.

What is claimed is:

1. A system comprising:
an optic coupler of a spectrometer, including a plurality of input branches optically connected to an output end of the optic coupler;
a plurality of light sources coupled to the plurality of input branches, wherein a first light source of the plurality of light sources outputs light having a different wavelength distribution than at least one other light source of the plurality of light sources, wherein the first light source comprises an incandescent light, wherein the incandescent light comprises a low-color-temperature incandescent light, wherein the plurality of light sources are combined in the optic coupler to form a broadband light source configured to illuminate a sample under analysis with the spectrometer;
wherein the output end of the optic coupler emits the broadband light source comprising a combined spectral output of the plurality of light sources.

2. The system of claim 1, wherein the optic coupler comprises a fused coupler.

3. The system of claim 1, wherein the optic coupler comprises a fiber optic coupler.

4. The system of claim 3, wherein the fiber optic coupler comprises a dual-branch fiber optic light guide.

5. The system of claim 4, wherein the incandescent light is coupled to a first input branch of the fiber optic coupler.

6. The system of claim 5, wherein the plurality of light sources includes a light emitting diode (LED).

7. The system of claim 6, wherein the LED is coupled to a second input branch of the fiber optic coupler.

8. The system of claim 6, wherein the LED comprises a white-light LED.

9. The system of claim 3, wherein the fiber optic coupler comprises a quad-branch fiber optic light guide.

10. The system of claim 9, wherein the incandescent light is coupled to a first input branch of the fiber optic coupler.

11. The system of claim 10, wherein the incandescent light comprises a low-color-temperature incandescent light.

12. The system of claim 10, wherein the plurality of light sources include a first LED.

13. The system of claim 12, wherein the first LED is coupled to a second input branch of the fiber optic coupler.

14. The system of claim 12, wherein the first LED comprises a white-light LED.

15. The system of claim 12, wherein the plurality of light sources include a second LED.

16. The system of claim 15, wherein the second LED is coupled to a third input branch of the fiber optic coupler.

17. The system of claim 15, wherein the second LED comprises a short-wavelength LED.

18. The system of claim 15, wherein the plurality of light sources include a third LED.

19. The system of claim 18, wherein the third LED is coupled to a fourth input branch of the fiber optic coupler.

20. The system of claim 18, wherein the third LED comprises a short-wavelength LED.

21. The system of claim 1, wherein the optic coupler comprises a beam splitter.

22. The system of claim 21, wherein the plurality of input branches include a first face of the beam splitter and a second face of the beam splitter.

23. The system of claim 21, wherein the beam splitter is positioned to receive at the first face first illumination from the first light source, wherein the beam splitter directs the first illumination from the first face to the output.

24. The system of claim 23, wherein the beam splitter is positioned to receive at the second face second illumination from a second light source, wherein the beam splitter directs the second illumination from the second face to the output.

25. The system of claim 24, comprising a first lens positioned between the first light source and the first face of the beam splitter, wherein the first lens is a collimating lens.

26. The system of claim 25, comprising a second lens positioned between the second light source and the second face of the beam splitter, wherein the second lens is a collimating lens.

27. The system of claim 26, wherein the output comprises a third face of the beam splitter.

28. The system of claim 27, comprising a third lens positioned adjacent to the third face of the beam splitter, wherein the third lens is a focusing lens.

29. The system of claim 21, wherein the beam splitter comprises a broadband beam splitter.

30. The system of claim 21, wherein the beam splitter comprises a hot mirror beam splitter.

31. The system of claim 21, wherein the beam splitter comprises a cold mirror beam splitter.

32. The system of claim 24, wherein the incandescent light comprises a low-color-temperature incandescent light.

33. The system of claim 24, wherein the second light source includes a light emitting diode (LED).

34. The system of claim 33, wherein the LED comprises a white-light LED.

35. The system of claim 1, wherein the optic coupler comprises an integrating sphere.

36. The system of claim 35, wherein the plurality of input branches comprise a plurality of ports.

37. The system of claim 36, wherein the output comprises an output port.

38. The system of claim 36, wherein the incandescent light is coupled to a first port of the integrating sphere.

39. The system of claim 38, wherein the incandescent light comprises a low-color-temperature incandescent light.

40. The system of claim 38, wherein the plurality of light sources includes a light emitting diode (LED).

41. The system of claim 40, wherein the LED is coupled to a second port of the integrating sphere.

42. The system of claim 41, wherein the LED comprises a white-light LED.

43. The system of claim 41, wherein the plurality of light sources include a second LED.

44. The system of claim 43, wherein the second LED is coupled to a third port of the integrating sphere.

45. The system of claim 43, wherein the second LED comprises a short-wavelength LED.

46. The system of claim 43, wherein the plurality of light sources include a third LED.

47. The system of claim 46, wherein the third LED is coupled to a fourth port of the integrating sphere.

48. The system of claim 46, wherein the third LED comprises a short-wavelength LED.

49. A system comprising:
an optic coupler of a spectrometer, including a plurality of inputs optically connected to an output end of the optic coupler;
a first light source coupled to a first input of the plurality of inputs, wherein the first light source comprises an incandescent light, wherein the incandescent light comprises a low-color-temperature incandescent light; and
a second light source coupled to a second input of the plurality of inputs, wherein the second light source outputs light having a different wavelength distribution than at least the first light source of the plurality of light sources;
wherein the output end of the optic coupler emits a broadband light source comprising a combined spectral output of the first light source and the second light source configured to illuminate a sample under analysis with the spectrometer, wherein the first light source and the second light source are combined in the optic coupler to form the broadband light source.

50. The system of claim 49, wherein the optic coupler comprises a fiber optic light guide including a plurality of input branches.

51. The system of claim 50, wherein the plurality of inputs includes the plurality of input branches.

52. The system of claim 49, wherein the optic coupler comprises a beam splitter.

53. The system of claim 52, wherein the plurality of inputs includes a plurality of faces of the beam splitter.

54. The system of claim 49, wherein the optic coupler comprises an integrating sphere.

55. The system of claim 54, wherein the plurality of inputs comprises a plurality of ports of the integrating sphere.

56. A system comprising:
an optic coupler of a spectrometer, including a plurality of inputs optically connected to an output end of the optic coupler;
a first light source coupled to a first input of the plurality of inputs, wherein the first light source comprises an incandescent light, wherein the incandescent light comprises a low-color-temperature incandescent light;
a second light source coupled to a second input of the plurality of inputs, wherein the second light source outputs light having a different wavelength distribution than at least the first light source;
a third light source coupled to a third input of the plurality of inputs, wherein the third light source outputs light having a different wavelength than at least the first light source and the second light source;
a fourth light source coupled to a fourth input of the plurality of inputs, wherein the fourth light source outputs light having a different wavelength than at least the first light source and the second light source;
wherein the output end of the optic coupler emits a broadband light source configured to illuminate a sample under analysis with the spectrometer, and comprising a combined spectral output of the first light source, the second light source, the third light source, and the fourth light source, wherein the first light source, the second light source, the third light source and the fourth light source are combined in the optic coupler to form the broadband light source.

57. The system of claim 56, wherein the optic coupler comprises a fiber optic light guide including a plurality of input branches.

58. The system of claim 57, wherein the plurality of inputs includes the plurality of input branches.

59. The system of claim 56, wherein the optic coupler comprises at least one beam splitter.

60. The system of claim 59, wherein the plurality of inputs includes a plurality of faces of the at least one beam splitter.

61. The system of claim 56, wherein the optic coupler comprises an integrating sphere.

62. The system of claim 61, wherein the plurality of inputs comprises a plurality of ports of the integrating sphere.

* * * * *